April 18, 1933.    H. C. KARST    1,903,767
DRINKING FOUNTAIN FOR POULTRY
Filed Feb. 21, 1931
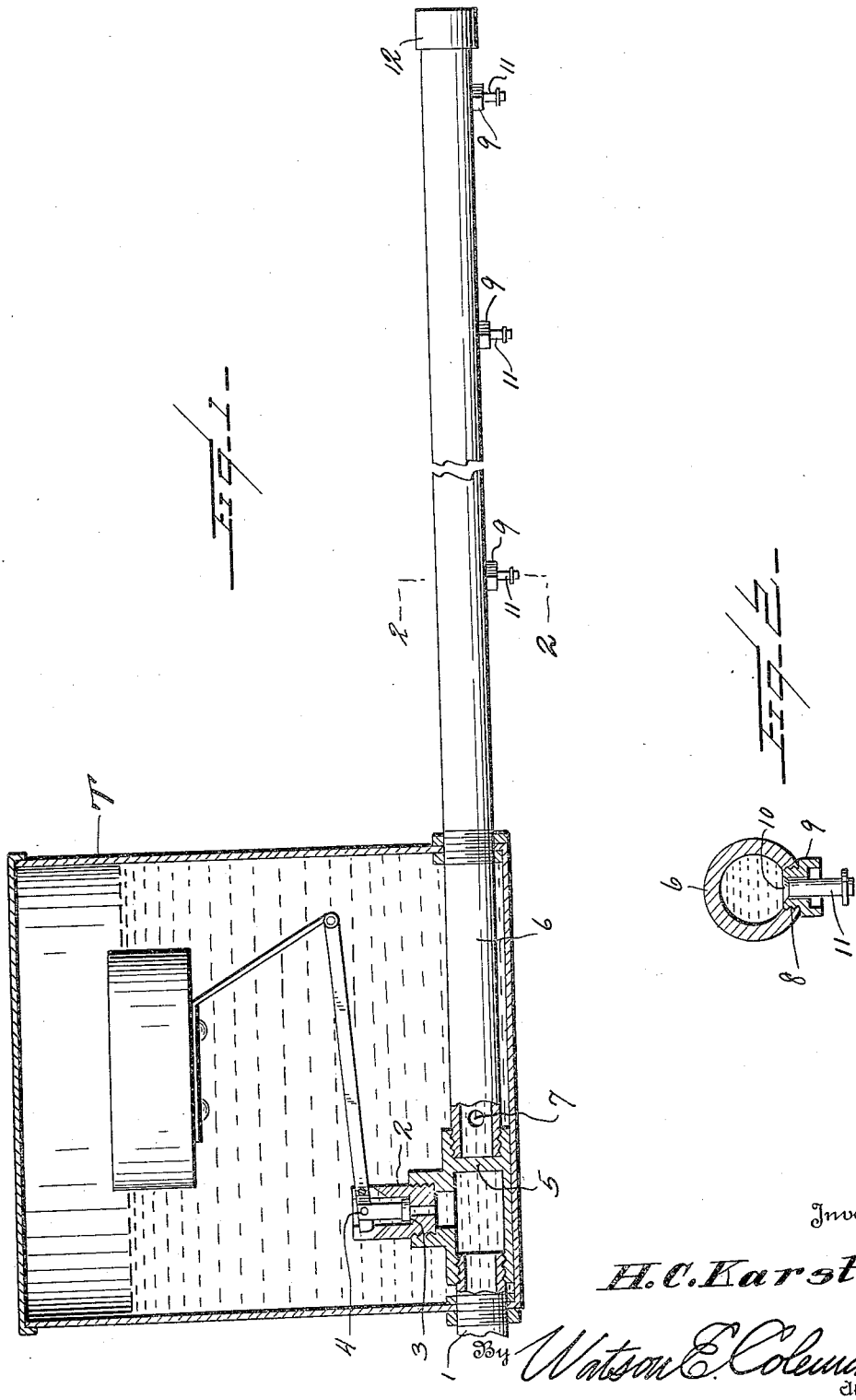
Inventor
H.C.Karst
By Watson E. Coleman
Attorney Patented Apr. 18, 1933

1,903,767

UNITED STATES PATENT OFFICE

HENRY C. KARST, OF SONOMA, CALIFORNIA

DRINKING FOUNTAIN FOR POULTRY

Application filed February 21, 1931. Serial No. 517,594.

This invention relates to drinking fountains for poultry, and it is an object of the invention to provide a device of this kind constructed and operating in a manner to maintain the same highly sanitary and which in its use substantially eliminates the possibility for the spread of infection.

It is also an object of the invention to provide a fountain of this kind comprising one or more normally closed valves, said valve or valves being adapted to be opened by the beak of a fowl and wherein the fountain includes a manifold pipe leading from a suitable source of supply with the manifold pipe having interposed therein means for reducing the water pressure before it reaches the valve or valves.

The invention consists in the details of construction and in the combination and arrangement of the several parts of my improved drinking fountain for poultry whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view partly in section and partly in elevation illustrating a drinking fountain for poultry constructed in accordance with an embodiment of my invention.

Figure 2 is an enlarged sectional view taken substantially on the line 2—2 of Figure 1.

As disclosed in the accompanying drawing, T denotes a tank of desired capacity and supported as desired in any manner preferred. Leading from a suitable source of water supply and extending within the lower portion of this tank T is a pipe line 1. The pipe 1 within the tank has in communication therewith an upstanding nipple 2 provided with an internal valve seat 3 with which coacts a float control valve 4. The pipe line 1 beyond the nipple 2 is closed, as at 5, so that water passing through the pipe line 1 will discharge into the tank T through the nipple, and when the water within the tank T reaches a predetermined level such flow through the nipple 2 will be stopped by the float control valve 4. Of course, as the water level drops this valve will open, thus assuring substantially a constant water level within the tank.

The pipe line 1 beyond its seal 5 is continued by a pipe line 6 which may be of any length desired and supported in any way preferred.

This pipe line 6 adjacent the seal 5 of the pipe line 1 and within the tank T is provided with a relatively small entrance opening 7 so that water will be admitted within the pipe line 6 at a negligible pressure, thus assuring only a tiny stream to flow out through each of the discharge openings 8. The discharge openings 8 are positioned at desired points lengthwise of the pipe line 6 and are disposed downwardly. Each of these openings 8 in the present embodiment of my invention has threaded or otherwise positioned therein a nipple 9 the inner end of which constituting a valve seat for a weighted valve member 10 which is normally maintained closed by gravity. This weighted valve member 10 has a stem 11 extending a material distance below the pipe line 6 so that when a fowl desires to drink it places its beak against the lower end of the stem 11 and forces the same upwardly whereupon the valve 10 is opened and a desired stream of water will be discharged which the fowl swallows. After the fowl has completed its drink and its beak is removed from the the stem 11, the valve 10 automatically closes.

The weight of each of the valves 10 together with its stem 11 is sufficient to overcome any side or upward pressure which might tend to keep the valve open and with slight water pressure within the pipe 6 the weight of the valve is heavy enough to normally close completely its associated opening 8. It is also believed to be clearly apparent that a fountain constructed in accordance with an embodiment of the present invention is highly sanitary as the water at all times is entirely enclosed. As is believed to be apparent the pipe line 6 may be easily attached to or set within a wall or partition or otherwise maintained with convenience and facility in desired working position. It is to be noted that the pipe line 6 beyond the openings 8 is also sealed, as at 12.

From the foregoing description it is thought to be obvious that a drinking fountain for poultry constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A poultry drinking fountain comprising a tank having two alined openings each in an opposite wall thereof, an inlet pipe extending through one opening and directed toward the opposite opening, a second pipe having an opening within the tank extending through the second opening and directed toward the first pipe in alinement therewith and having downward directed openings in that portion of the pipe extending outwardly of the tank, a junction member connecting the adjoining ends of both pipes and securing the same within the tank, a float operated valve in the junction member for controlling the flow of water through the first named pipe, nipples in the second named pipe mounted in the openings, and valves mounted in said nipples and extending below the nipples for engagement by the beak of a fowl.

In testimony whereof I hereunto affix my signature.

HENRY C. KARST.